UNITED STATES PATENT OFFICE.

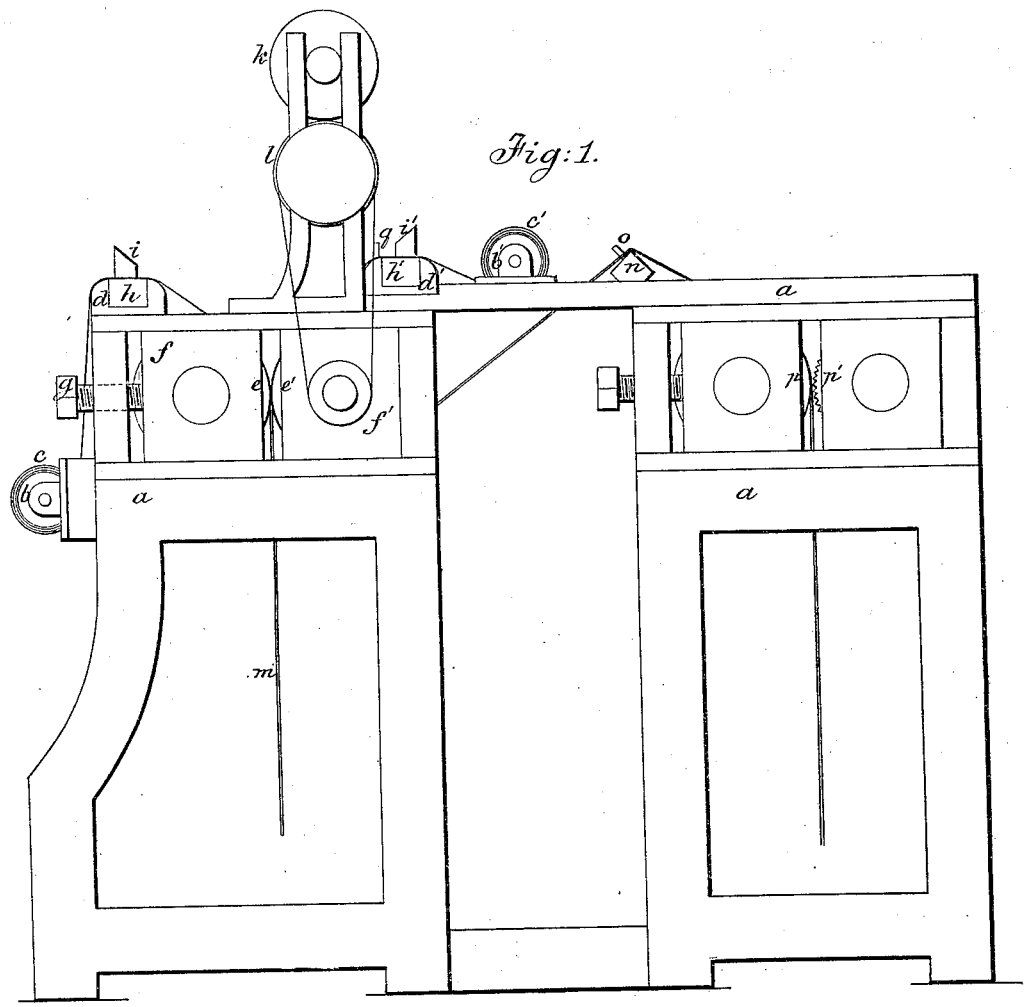

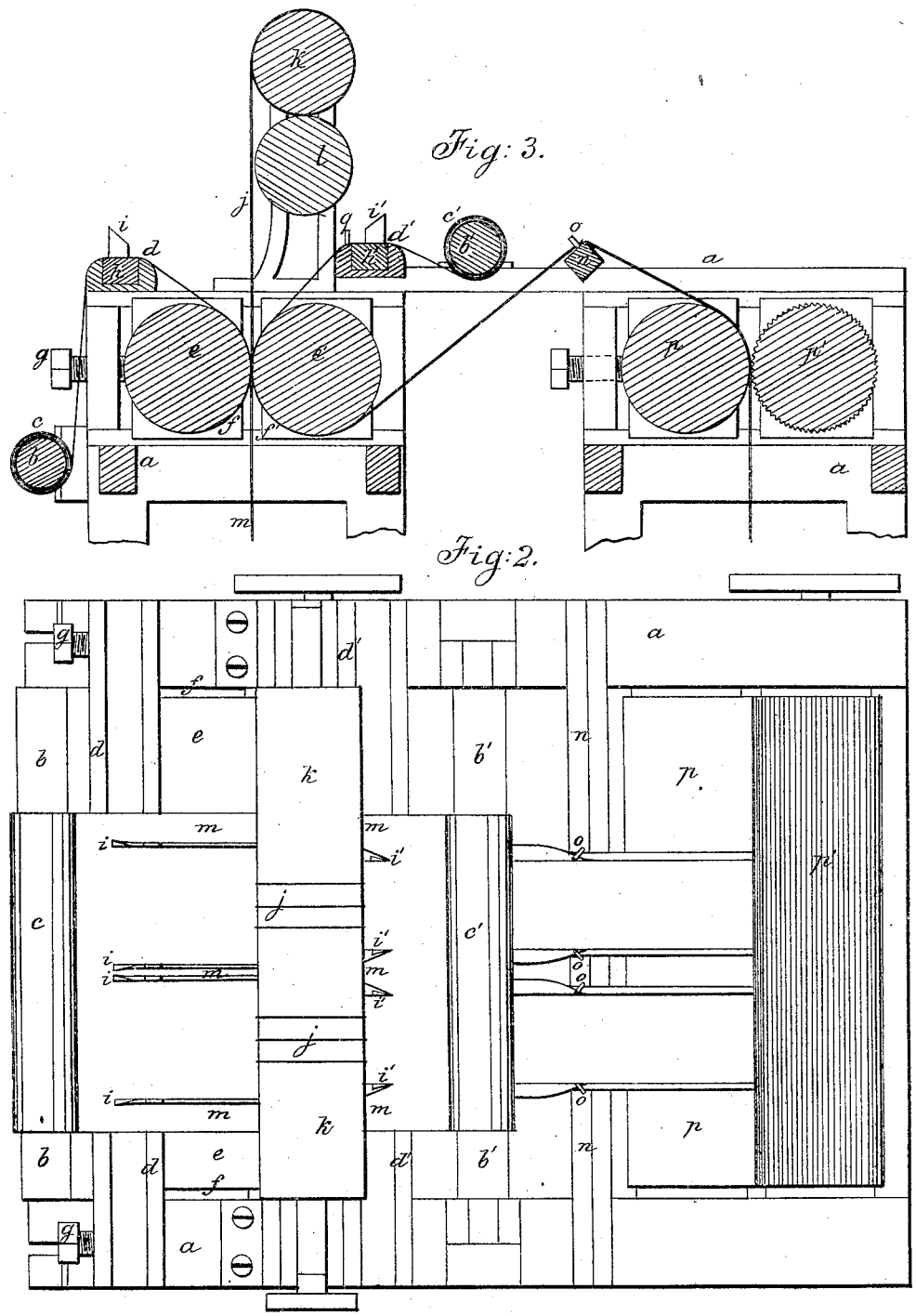

RICHARD SOLIS, OF NEW BRUNSWICK, NEW JERSEY.

MACHINERY FOR MANUFACTURING SHIRRED GOODS.

Specification of Letters Patent No. 22,038, dated November 9, 1858.

*To all whom it may concern:*

Be it known that I, RICHARD SOLIS, of New Brunswick, in the State of New Jersey, have invented certain new and useful improvements in machinery for making what is known as elastic shirred or corrugated or other fabrics, composed of two laminæ of cloth cemented; and I do hereby declare that the following is a full, clear, and exact description thereof, reference being had to the accompanying drawings, making part of this specification, in which—

Figure 1, is a side elevation of the machine; Fig. 2, a plan; and Fig. 3, a longitudinal vertical section.

The same letters indicate like parts in all the figures.

My said invention relates more particularly to improvements in machinery for making that kind of elastic fabric known as shirred goods in which threads or strips of india rubber in a distended state are inclosed between two laminæ of cloth coated with india rubber or other cement, and cemented to the elastic threads or strips, and to each other between the said threads or strips, but it is equally applicable to other fabrics whether elastic or non-elastic, which are formed by cementing together two laminæ of cloth.

In the manufacture of this fabric it has been the practice to make it of greater width than required for use and then to cut it to the required width. This leaves the edges rugged without selvage, and requiring, for many purposes, to be bound, which is attended with much labor and expense.

The object of my invention of machinery is to make such fabrics of the required width from cloths of comparatively greater width, by cutting or slitting such wide cloths to the width required in the operation of making the fabric; and also to form such fabrics with turned or lapped and cemented selvages by cutting the strips, which are to form the outer lamina of the fabric, wider than the strips which are to form the inner lamina, or wrong side of the fabric, and by the operation of the machine to turn and lap over and cement the edges of the wide lamina either upon itself or over the edges of the narrow lamina.

In the accompanying drawings $a$ represents a suitable frame, and $b$, $b'$, two rollers the journals of which are mounted in suitable boxes. The two pieces of cloth $c$ and $c'$, which are to form the two laminæ of the shirred fabric, and which are coated on one face with india rubber cement in the usual way, are rolled up, each on one of the said rollers $b$, $b'$ with the side coated with cement inward. From these rollers or beams the two pieces of cloth pass from opposite directions and each over a bar $d$, $d'$, mounted in the upper part of the frame and thence down to the bight of a pair of rollers $e$, $e'$, the journals of which are mounted in boxes $f$, $f'$, the set of boxes $f$ being adjustable by screws $g$ to give the required bight to the cloths as they are both with their cemented faces brought in contact, carried through, and made to unite to each other and to the threads of india rubber in a distended state. The rollers $e$, $e'$, are to be turned in the usual or any suitable way to cement the two cloths and carry them through, and the two cloths thus carried through are separately kept in a distended state in the usual manner, such as by the application of friction to the rollers $b$, $b'$.

The bars $d$, $d'$, are grooved out on their upper surfaces, and to these grooves are accurately fitted blocks $h$, $h'$, so that they can be made to slide therein for adjustment relatively to each other, when struck with a hammer or other means. Each one of these blocks carries a vertical knife $i$, $i'$. These blocks are so arranged and set as to have the knives at the distances apart suited to cut the two pieces of cloth $c$, $c'$, into strips of the required width from end to end depending upon the intended width of the fabric to be made, and as the strips of the cloth $c$ is to have its edges lapped over on itself or over the edges of the strips cut from the piece $c'$ to form the selvages, the knives $i$ are to be set at a correspondingly greater distance apart.

To begin the operation the two pieces of cloth $c$, $c'$, are to have short slits cut in them at the distance apart equal to the intended width of the strips to be cut. These slits are placed over the knives and the end of the cloths put in the bight of the rollers $e$, $e'$, and then the operation of slitting will be performed automatically the whole length of the two pieces of cloth.

The cords or strips of india rubber $j$ which are to be interposed between the two laminæ of cloth, are to be rolled up in the usual manner on a roller $k$ placed above a motive roller $l$. The ends of the elastic cords or threads are placed between the two laminæ of cloth and together passed between the rollers e, e', so that the two laminæ of cloth are thus cemented to these elastic threads or strips and to each other between the elastic threads, the said elastic threads, during the operation, being held in a distended state in manner well known to manufacturers of shirred fabrics, (if the machine be used for making shirred goods) so that when the fabric is completed and the elastic threads liberated from the tension under which they were held, they contract and shirr or corrugate the lamina of cloth, and thus produce what is known in the market as shirred goods or fabrics.

As the strips of cloth pass out below the two rollers e, e', the narrow refuse strips m drop down on the floor or in a suitable receptacle, and the series of strips of cloth cemented, as above described, are carried around and over a bar n, which I prefer to make angular, as represented, although it may be round, and even a roller mounted on journals will answer the purpose; but I prefer a stationary angular bar such as represented, as I have found that best for the purpose. As the strips approach the angle of the bar, they pass between pins o, o, placed at a distance apart about equal to the width of fabric intended to be produced, and hence at a less distance apart than the wide strips. This bends up the two edges of the wide lamina which are completely bent over, and by reason of the tension over the bar n forced down making complete laid and cemented selvages, the edges of the wide lamina abutting against the edges of the narrow lamina or overlapping them in the manner of a hem. From this bar the strips are passed between suitable rollers p, p', or other apparatus, by which the completed fabric is drawn over the bar n and kept under the required tension during the operation.

As the laminæ cut from the cloth c' are narrower than those cut from the cloth c, the intermediate strips m from the cloth c' will be wider than those from the cloth c and if permitted to pass of full width between the rollers e, e', would become cemented to the laminæ of the fabric to be produced and do serious injury. To prevent this the wide waste strips m are made to pass between pins q, q, by which they are so narrowed down to the width of the narrow waste strips from the other cloth.

I have not deemed it necessary to give a full and clear description of those parts of the machine which are common to the well known shirring machine, as these are well known to persons skilled in that branch of the arts.

I would remark that although I have found it advantageous to use the pins o, o, to turn in the edges of the wide lamina preparatory to forming the lap selvages by passing over the bar n, I do not wish to be understood as limiting myself to the use of such pins as the said selvages will be formed without such pins; but not so well as with them. And when I do not use such pins, I have found it advisable in starting to bend over the edges of the wide lamina by hand, and then the passage of the fabric in a distended state over the bar n will continue to effect the bending and lapping over.

It will be obvious that if the machine be used for making elastic fabrics not shirred the laminæ of cloth are themselves to be elastic, and if they be cemented to threads or strips of india rubber the rollers which supply such threads or strips should have their motions so regulated as not to stretch them, and if no threads or strips of any kind are to be introduced between the laminæ of cloth the operation of that part of the machinery is to be suspended.

I claim—

1. In combination with the rollers or equivalent means for cementing the two laminæ of cloth, and the rollers, or equivalent means, for keeping the united laminæ distended, and for moving them, as described, the employment of a bar, or the equivalent thereof over which the united laminæ are drawn to form the turned or lapped selvages, as described.

2. And I also claim in combination with the selvage bar, or its equivalent, and the means herein described for moving and keeping the laminæ distended, or equivalents therefor, the employment of pins for turning the edges in forming the turned or lapped selvages, as described.

RICHARD SOLIS.

Witnesses:
Wm. H. Bishop,
Andrew D. Lacy.